United States Patent [19]
Matejcek et al.

[11] Patent Number: 5,270,376
[45] Date of Patent: Dec. 14, 1993

[54] AQUEOUS POLYMER DISPERSION HAVING DIVALENT METAL SALT(S) INCORPORATED THEREIN

[75] Inventors: Franz Matejcek, Lambsheim; Maximilian Angel, Mutterstadt; Rudolf Schuhmacher, Boehl-Iggelheim, all of Fed. Rep. of Germany

[73] Assignee: BASF Aktiengesellschaft, Ludwigshafen, Fed. Rep. of Germany

[21] Appl. No.: 928,768

[22] Filed: Aug. 17, 1992

Related U.S. Application Data

[63] Continuation of Ser. No. 655,826, Feb. 15, 1991, abandoned.

[30] Foreign Application Priority Data

Feb. 16, 1990 [DE] Fed. Rep. of Germany ....... 4004915

[51] Int. Cl.$^5$ .......................... C08J 3/02; C08K 3/20; C08L 33/08
[52] U.S. Cl. .................................... 524/501; 524/425; 524/460
[58] Field of Search ......................... 524/501, 425, 460

[56] References Cited

U.S. PATENT DOCUMENTS

| | | | |
|---|---|---|---|
| 4,265,977 | 5/1981 | Kawamura et al. | 428/511 |
| 4,518,658 | 5/1985 | Baravian et al. | 428/291 |
| 4,912,147 | 3/1990 | Pfoehler et al. | 524/460 |

FOREIGN PATENT DOCUMENTS

| | | |
|---|---|---|
| 0174566 | 3/1986 | European Pat. Off. |
| 0373918 | 6/1990 | European Pat. Off. |
| 1051436 | 2/1959 | Fed. Rep. of Germany |
| 1811247 | 7/1969 | Fed. Rep. of Germany |

*Primary Examiner*—Paul R. Michl
*Assistant Examiner*—U. K. Rajguru
*Attorney, Agent, or Firm*—Oblon, Spivak, McClelland, Maier & Neustadt

[57] ABSTRACT

A process is provided for the preparation of an aqueous polymer dispersion which entails incorporating one or more divalent metals of magnesium, calcium or zinc in the form of an oxide, hydroxide, carbonate or bicarbonate, or in the form of a mixture of these basic salts into an aqueous starting dispersion containing a polymer A as the dispersed phase, an effective amount of an emulsifier and water as the remainder, at a temperature below the boiling point of pure water and above the glass transition point of the polymer A, wherein polymer A consists essentially of monomers, a) which are one or more $\alpha$, $\beta$-monoethylenically unsaturated mono- or di-carboxylic acids containing from 3 to 5 carbon atoms, an anhydride o these acids or a mixture thereof; and monomers b) being one or more other copolymerizable monomers.

7 Claims, No Drawings

AQUEOUS POLYMER DISPERSION HAVING DIVALENT METAL SALT(S) INCORPORATED THEREIN

This application is a continuation of application Ser. No. 07/655,826, filed on Feb. 15, 1991, now abandoned.

The present invention relates to an aqueous polymer dispersion obtainable by incorporating into an aqueous starting dispersion containing A) from 25 to 60% by weight, based on the starting dispersion, of a polymer A as the disperse phase, built up from
  a) from 3 to 55% by weight of one or more α, β-monoethylenically unsaturated mono- or dicarboxylic acids containing from 3 to 5 carbon atoms, of an anhydride of these acids or of a mixture of these monomers (monomers a), and
  b) from 45 to 97% by weight of one or more other copolymerizable monomers (monomer b), in polymerized form and having, in disperse form, a mean particle size of from 20 to 400 nm,
B) an effective amount of an emulsifier, and
C) water as the remainder, at a temperature below the boiling point of pure water and above the glass transition point of the polymer A, from 5 to 60 mol-%, based on the number of moles of acid functions of the polymer A copolymerized in the form of the monomers a, of one or more of the divalent metals magnesium, calcium and zinc in the form of the oxide, hydroxide, carbonate or bicarbonate or in the form of a mixture of these basic salts.

In addition, the present invention relates to a process for producing this polymer dispersion and to the use of the dispersion as a binder for a foaming, spraying, coating, bonding, sealing, coloring or impregnating material, to a binder prepared therefrom for nonwoven material for roof sheeting, and to nonwoven-based bitumen-treated roof sheeting containing this binder.

DE-B 10 51 436 describes aqueous polymer dispersions having a polymer content of from 1 to 60% by weight and containing, as the polymer, a copolymer built up from one or more lower alkyl esters of acrylic or methacrylic acid and from 0.25 to 25 mol-% of acrylic, methacrylic or itaconic acid, and additionally containing a basic metal compound from the group comprising the oxides, hydroxides and other basic salts, for example the acetates, of polyvalent metals, the amount of the basic metal compound being sufficient to neutralize from 0.25 to 25 mol-% of the carboxyl groups of the copolymer. These aqueous synthetic resin dispersions are recommended for forming films which are to have increased internal strength, the polymer dispersions which contain a relatively readily water-soluble metal compound, e.g. an acetate, being preferred over polymer dispersions which contain a basic metal compound of lower water solubility, e.g. an oxide or hydroxide, since the use of these less water soluble, basic metal compounds gives synthetic resin dispersions which tend to form a sediment on standing, are not entirely satisfactory with respect to their internal strength, and give films which are generally cloudy. However, a disadvantage of synthetic resin dispersions which contain a relatively readily watersoluble metal compound is that the anions causing the good water solubility of the metal compound, e.g. the acetate anion, are generally on the one hand not inert and on the other hand are not a constituent of the water, which generally impairs the properties of the synthetic resin dispersions or means that they do not meet purity requirements. Accordingly, aqueous polymer dispersions containing polyvalent metals are also disadvantageous since, although they contain the metal, for example, in the form of an oxide or hydroxide, the metal is, however, incorporated with the aid of non-inert auxiliary systems in order to avoid coagulation and sedimentation and to ensure production of clear films of high internal strength. Examples of dispersions of this type are given, inter alia, in DE-A-18 11 247, in which, for example, the auxiliary system employed is ammonia, which is capable of complexing the metallic components in aqueous solution.

It is an object of the present invention to provide aqueous polymer dispersions for producing films of high internal strength, avoiding said disadvantages, in particular even at an increased solids content. A further object is to provide binders for nonwovens, which can be employed, for example, for bitumen-treated roof sheeting having good applicational properties, such as high heat resistance.

We have found that this object is achieved by the aqueous polymer dispersions defined at the outset.

We have furthermore found a preparation process for the preparation of these dispersions, their use as binders, nonwovens based on these dispersions, and bitumen-treated roof sheeting produced using these nonwovens.

Good results are obtained when the polymer A is built up from 10 to 25% by weight of a) and from 75 to 90% by weight of b).

Suitable monomers a are, inter alia, acrylic acid, methacrylic acid, maleic acid, fumaric acid, crotonic acid and itaconic acid. Preference is given to acrylic acid and methacrylic acid, the copolymerization of methacrylic acid being particularly advantageous.

Suitable monomers b are advantageously esters of acrylic or methacrylic acid with an aliphatic alcohol containing from 1 to 10 carbon atoms, the methyl, ethyl, isopropyl, n- and isobutyl, n-hexyl and 2-ethylhexyl esters being preferred. A particularly preferred acrylate is n-butyl acrylate, which is advantageously copolymerized in amounts of more than 50% by weight, based on the total amount of the monomers. Good results are obtained by using 2-ethylhexyl esters.

Other suitable monomers b are aromatic vinyl compounds, such as styrene, vinyl esters of lower alkanecarboxylic acids, such as vinyl acetate and vinyl propionate, vinyl chloride, vinylidene chloride, nitriles of lower α,β-monoethylenically unsaturated carboxylic acids, such as acrylonitrile and methacrylonitrile, and the amides of these carboxylic acids, acrylates or methacrylates of lower polyhydric alcohols, unsaturated sulfonic and phosphonic acids and alkali metal salts thereof, such as sodium vinylsulfonate, but also lower monounsaturated or polyunsaturated hydrocarbons, such as ethylene and butadiene. If the monomers b are alkali metal salts of monoethylenically unsaturated acids, their proportion by weight, based on the total amount of the monomers, should not exceed 1% by weight Methacrylonitrile, acrylamide, methacrylamide, hydroxyethyl acrylate, hydroxypropyl acrylate and/or in particular acrylonitrile is/are preferably copolymerized in amounts of from 4 to 15% by weight, based on the total amount of the monomers.

Groups of polymers A having good applicational properties have, in copolymerized form, the following monomer compositions:

I) from 3 to 45, preferably from 10 to 25% by weight of monomers a from 55 to 97, preferably from 75 to 90% by weight of one or more esters of acrylic and/or methacrylic acid with an aliphatic alcohol containing from 1 to 10 carbon atoms, and from 0 to 40% by weight of other copolymerizable monomers, II) from 3 to 30, preferably from 10 to 30% by weight of monomers a, from 35 to 52% by weight of styrene, and from 35 to 45% by weight of butadiene, III) from 5 to 25, preferably from 10 to 25% by weight of monomers a, from 40 to 70% by weight of vinyl acetate and/or vinyl propionate, and from 5 to 40% by weight of ethylene, the group I compositions being particularly preferred.

The groups IV to VI of polymers A having particularly good water resistance have, in copolymerized form, the following monomer compositions:

IV) from 3 to 44.5% by weight, preferably from 6 to 20% by weight, of monomers a, from 55 to 96.5% by weight, preferably from 60 to 90% by weight, of one or more esters of acrylic or methacrylic acid with an aliphatic alcohol having from 1 to 10 carbon atoms, from 0.5 to 5% by weight, preferably from 0.9 to 4% by weight, of N-methylolacrylamide, N-methylolmethacrylamide, acrylamidoglycolic acid or methacrylamidoglycolic acid, and from 0 to 40% by weight of other copolymerizable monomers, V) from 3 to 30, preferably from 10 to 25% by weight of monomers a, from 35 to 48% by weight of styrene, from 35 to 45% by weight of butadiene, and from 0.5 to 5% by weight, preferably from 0.9 to 4% by weight, of N-methylolacrylamide, N-methylolmethacrylamide, acrylamidoglycolic acid or methacrylamidoglycolic acid, VI) from 5 to 20, preferably from 10 to 20% by weight of monomers a, from 40 to 70% by weight of vinyl acetate and/or vinyl propionate, from 5 to 40% by weight of ethylene, and from 0.5 to 5% by weight, preferably from 0.9 to 4% by weight, of N-methylolacrylamide, N-methylolmethacrylamide, acrylamidoglycolic acid or methacrylamidoglycolic acid.

The percent by weight of the compositions I to VI are each based on the total amount of the monomers.

N-Methylol(meth)acrylamide is preferred over (meth)acrylamidoglycolic acid. Acrylamidoglycolic acid has the formula $$CH_2=CH-CO-N-CHOH-COOH.$$

Good results are given by the group IV compositions.

In total, the proportions by weight of the monomers participating in the structure of a polymer A are preferably selected in such a manner that the polymer A has a glass transition point of from $-40°$ to 60° C., preferably from $-30°$ to 20° C. The glass transition temperature can be measured in a known manner in accordance with ASTM Standard 3418/82 (midpoint temperature). The Tg can be estimated by applying the Fox relationship to the proportions by weight of the constituent monomers of a polymer. According to Fox (T. G. Fox, Bull. Am. Phys. Soc. (Ser. II) 1 (1956), 123), the following equation is a good approximation for the glass transition point of copolymers:

$$\frac{1}{Tg} = \frac{X^1}{Tg^1} + \frac{X^2}{Tg^2} + \ldots \frac{X^n}{Tg^n},$$

where $X^1, X^2, \ldots X^n$ are the mass fractions of monomers $1, 2, \ldots, n$, and $Tg^1, Tg^2, \ldots Tg^n$ are the glass transition points in Kelvin of the polymers in each case built up from only one of the monomers $1, 2, \ldots$ or n. The glass transition points of these homopolymers of the abovementioned monomers are in most cases known and are listed, for example, in J. Brandrup, E. H. Immergut, Polymer Handbook 1st Ed., J. Wiley, New York, 1966, and 2nd Ed. J. Wiley, New York, 1975.

The aqueous starting dispersions employed are preferably primary dispersions, i.e. dispersions prepared by free-radical polymerization of the respective monomers a and b in aqueous medium under the known conditions of emulsion polymerization in the presence of water-soluble, free radical-forming initiators and emulsifiers. Preferred starting dispersions therefore comprise the polymer A, emulsifier B and water as the remainder.

Particularly suitable water-soluble emulsion polymerization initiators are inorganic peroxides, of which particular preference is given to the peroxydisulfates, that is those of sodium, potassium or ammonium.

Suitable emulsifiers are anionic, cationic and nonionic emulsifiers, preference being given to anionic emulsifiers, in particular used alone. Particularly successful emulsifiers are ethoxylated alkylphenols (EO degree: from 3 to 30, alkyl radical: $C_8$ to $C_{10}$), ethoxylated fatty alcohols (EO degree: from 5 to 50, alkyl radical: $C_8$ to $C_{25}$), the alkali metal salts of the sulfated derivatives of these ethoxylation products and the alkali metal salts of alkylsulfonic acids, e.g. sodium n-dodecylsulfonate or sodium n-tetradecylsulfonate, of alkylarylsulfonic acids, e.g. sodium n-dodecylbenzenesulfonate or sodium n-tetradecylbenzenesulfonate, of higher fatty acids, such as palmitic and stearic acid, and of disulfonated mono- or dialkyldiphenyl ethers.

The desired mean particle size d of the disperse phase, from 20 to 400 nm, preferably from 20 to 300 nm (determined by the dynamic light scattering method, see for example E. Lüddecke and D. Horn, Chem. Ing. Tech. 54 (1982), 266 or H. Auweter and D. Horn, J. Coll. and Int. Sci. 105 (1985), 399), can be controlled in a conventional manner by means of the amount and type of the emulsifiers used, the polymer particles being larger the smaller the amount of emulsifier used. Based on the amount of monomers employed, from 0.3 to 4% by weight, preferably from 0.4 to 3.5% by weight, of emulsifiers are generally employed Aqueous starting dispersions whose light transparency (LT), after dilution to a solids content of 0.01% by weight, and measured using a commercially available photometer (at a wavelength of 0.546 μm) and a path length of 25 mm relative to water (which is randomly given an LT of 100) is from 25 to 98, preferably from 65 to 95, are usually obtained. The LT of an aqueous polymer dispersion is a qualitative measure of the mean particle size of the disperse phase. The emulsion polymerization temperature and the amount of polymerization initiators used are set in a conventional manner such that a weight average molecular weight $\overline{M}_w$ of the dispersed polymer A of from $5 \cdot 10^3$ to $5 \cdot 10^6$, preferably $10^5$ to $2 \cdot 10^6$, is obtained If necessary, molecular weight regulators, such as tert-dodecyl mercaptan, can also be used. Further possible assistants are buffers, such as sodium pyrophosphate. The emulsion polymerization temperature is generally from 25° to 100° C., preferably from 60° to 95° C., and the polymerization initiators are usually used in amounts, based on the monomers, of from 0.1 to 3% by weight.

The emulsion polymerization for the preparation of the polymer A can be carried out either batchwise or as a feed process, stepwise polymerization also being possible in both cases. Preference is given to the feed process, in which some of the polymerization batch is heated to the polymerization temperature and the remainder is subsequently added continuously in separate feeds, of which one contains the monomer in pure or emulsified form. Feeding of the monomers as an aqueous emulsion is preferred. The solids content of the starting dispersion is preferably from 40 to 55% by weight.

Of the suitable basic salts of the divalent metals magnesium, calcium and zinc, namely the oxides, hydroxides, carbonates and bicarbonates, the oxides are of particular interest. The metallic component used is advantageously zinc, since it produces a particularly high internal strength of the films produced from the aqueous synthetic resin dispersions according to the invention and results, in a notable manner, in polymer dispersions having advantageous flow properties, in particular at high solids contents. The basic salts are generally incorporated as fine grains by stirring into the starting dispersion, whose pH is preferably less than 3, for from 2 to 3 hours. Increased temperatures during stirring in favor incorporation of the basic salts.

The preferred grains have a BET surface area determined by the method of Brunauer, Emmet and Teller (see P. W. Atkins, Physikalische Chemie, VCH-Verlag, D-6940 Weinheim, 1987, page 799ff) of from 2 to 5 m²/g.

In an advantageous manner for application, the finely divided basic salts are stirred in after prior moistening, for example by preparing a paste having a solids content of from 10 to 80% by weight, preferably from 20 to 70% by weight, from the finely divided salt with addition of water, and subsequently incorporating the paste into the starting dispersion. If necessary, small amounts of wetting agents can additionally be incorporated during preparation of the paste, it being expedient to employ the same surfactants to prepare the starting dispersion as used during the emulsion polymerization.

Based on the number of moles of acid functions of the polymers A copolymerized in the form of the monomers, with an anhydride group being counted as two acid groups, advantageously from 30 to 55 mol-% and particularly preferably from 40 to 55 mol-%, of one or more of the divalent metals magnesium, calcium or zinc in the form of an oxide, hydroxide, carbonate or bicarbonate are advantageously incorporated into the starting dispersion. The incorporation temperature is preferably 20° C. or more above the glass transition point of the polymer A.

The aqueous polymer dispersions according to the invention generally have no tendency toward sedimentation on standing and hardly any coagulation occurs during their preparation. Films produced from them are generally clear and have an increased internal strength. The latter is apparent, in particular, from the high modulus of elasticity, even at up to 200° C., and increased values for the tear strength The water resistance also achieves good values. Notably, the aqueous synthetic resin dispersions according to the invention containing zinc as the divalent metal have an increased frost resistance.

The aqueous polymer dispersions according to the invention are suitable as binders for foaming, spraying, coating, bonding, sealing, coloring or impregnating materials. Depending on the particular application, it is also possible to add additives, such as fillers, external plasticizers, preservatives or other assistants. The aqueous synthetic resin dispersions according to the invention are particularly suitable as binders in nonwoven materials for the production of roof sheeting, in which the nonwoven materials are subjected to a bitumen bath at from about 180° to 200° C. Preferred binders in nonwoven materials for the production of roof sheeting are aqueous polymer dispersions whose polymers A have a group I monomer composition and whose glass transition point is from −30° to 20° C.

When used as binders in nonwoven materials, the polymer dispersions according to the invention are expediently used in the dilute state, generally at an overall solids content of from 10 to 20% by weight.

Nonwoven materials are produced in a known manner by the consolidation of nonwoven fiber fabrics, which may be spunbonded fabrics, or doubled, fiber reinforced, needle felted, rolled and/or shrink-treated nonwovens. The application of the novel binders to the nonwoven is carried out in a customary manner by impregnating, foam impregnating, spraying, nip padding or printing, after which excess binder is removed, for example by being squeezed off, and the impregnated nonwoven is then in general dried and heat-treated. The drying is carried out, for example, for from 1 to 15 minutes at from 100° to 200° C. The amount of binder used is generally also such that the polymer content of the consolidated nonwoven fiber fabric is from 10 to 60% by weight, based on the amount of fiber material.

Binders having particularly good wet strength are obtained if the polymer dispersions according to the invention, preferably those of composition II or III, in particular of composition I, are blended with from 0.5 to 20 parts by weight, preferably from 2 to 10 parts by weight, based on 100 parts by weight of the polymer of the aqueous polymer dispersion, of a methylol-containing resol or aminoplastic. These binders are used for non-woven materials for the production of roof sheeting. The above parts by weight are based on the dry weight of the polymer of the dispersion in accordance with DIN 53 189.

The resols and aminoplastics are, very generally, condensation products based on carbonyl compounds, such as formaldehyde, and certain OH- or NH-containing compounds.

Aminoplastics, such as melamine or urea resins, are generally known, for example from Encyclopedia of Polymer Science and Technology, Interscience Publishers, 1965, Vol. 2, page 1 ff., or Ullmanns Encyclopädie der technischen Chemie, Verlag Chemie, 4th Edition, Volume 7, pp. 403 to 423. The carbonyl compound usually employed is acetaldehyde, propionaldehyde, n-butyraldehyde, isobutyraldehyde, chloral, acetone or, in particular, formaldehyde. Suitable NH-containing components are carboxamides, urethanes, sulfonamides, thiourea, guanidine, sulfurylamide, cyanamide, dicyanamide, guanamines and in particular urea and melamine. The condensation is carried out in a conventional manner with acid or base catalysis, usually at from 50° to 100° C. Preference is given to water-soluble products which have a number average molecular weight of less than 3000, preferably from 400 to 1000, and contain free methylol groups.

Resols are preferred. They are likewise generally known from Encyclopedia of Polymer Science and Technology, Interscience Publishers, 1969, Vol. 10, page 1 ff., and Ullmanns Encyclopädie der technischen Chemie, Verlag Chemie, Volume 18, 4th Edition, pages 245 to 257. Suitable carbonyl components are those mentioned above. OH-containing compounds are phenol, which may be substituted by $C_1$- to $C_{18}$-alkyl, such as p-t-butylphenol, p-isooctylphenol, p-phenylphenol, p-isononylphenol, amylphenol, cyclohexylphenol, dodecylphenol, cashew oil and in particular bisphenol A. The condensation is usually catalysed by bases or salts and is continued to a number average molecular weight of not more than 3000, preferably from 400 to 1000, so that free methylol groups are present. Particular preference is given to a resol made from bisphenol A and formaldehyde in a ratio of from 1:2 to 1:4 containing about 3 to 4 methylol groups per molecule, in the form of an aqueous solution.

The resols or aminoplastics can be incorporated by methods known to those skilled in the art, preferably by mixing an aqueous solution thereof with the aqueous dispersion. It may be appropriate to equalize the viscosities of the dispersion and solution by adding water in order to simplify mixing. The resultant mixture preferably has a pH of from 6 to 8, in particular from 6.7 to 7.7.

Bitumen-treated, nonwoven-based roof sheeting produced using the binders according to the invention has good service properties and high heat resistance.

It is generally produced, as described, for example, in U.S. Pat. No. 4,518,658, by impregnating a nonwoven material, such as spunbond, based on polyesters, for example polyethylene terephthalate, or a glass fiber-reinforced nonwoven having a weight of from 120 to 250 g/m² with the binder so that, after drying, 100 parts by weight of the nonwoven generally contain form 10 to 25 parts by weight of the binder. Bitumen, usually at from about 180° to 200° C., and, if desired, up to 5 parts by weight, based on 100 parts by weight of bitumen, if customary auxiliaries, such as styrene-butadiene rubber, butadiene-nitrile rubber an dinorganic fillers, are added to the nonwoven material treated in this way, to give a bitumen-treated roof web having a weight of from 2 to 8 kg/m², particularly form 3 to 6 kg/m².

EXAMPLES

EXAMPLE 1

Various starting dispersions DA1 to DA15 and comparative starting dispersion of DAV1 to DAV3

DA1: A mixture of 591.3 g of water, 4.2 g of a 25% strength by weight aqueous solution of sodium vinylsulfonate, 2.6 g of a 40% strength by weight aqueous solution of sodium tetradecylsulfonate and 84.3 g of an aqueous monomer emulsion M1 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion M1 were added continuously to the reaction mixture via separate feeds over the course of 2 hours while maintaining the polymerization temperature, and the mixture was then polymerized for a further 1 hour.

M1: 591.4 g of water
1185 g of n-butyl acrylate
210 g of methacrylic acid
105 g of acrylonitrile
1.8 g of a 25% strength by weight aqueous solution of sodium vinylsulfonate and
14.6 g of a 40% strength by weight aqueous solution of sodium n-tetradecylsulfonate.

DA2: A mixture of 592.6 g of water, 4.2 g of a 25% strength by weight aqueous solution of sodium vinylsulfonate and 84.3 g of an aqueous monomer emulsion M2 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion M2 were added continuously to the reaction mixture via separate feeds over the course of 2 hours while maintaining the polymerization temperature, and the mixture was then polymerized for a further 1 hour.

M2: 590.2 g of water
1185 g of n-butyl acrylate
105 g of acrylonitrile
210 g of methacrylic acid
1.8 g of a 25% strength by weight aqueous solution of sodium vinylsulfonate and
17.2 g of a 40 % strength by weight aqueous solution of sodium n-tetradecylsulfonate.

DA3: A mixture of 592.6 g of water, 4.2 g of a 25% strength by weight aqueous solution of sodium vinylsulfonate and 84.9 g of an aqueous monomer emulsion M3 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion M3 were added continuously to the reaction mixture via separate feeds over the course of 2 hours while maintaining the polymerization temperature, and the mixture was then polymerized for a further 1 hour.

M3: 530.2 g of water
1185 g of n-butyl acrylate
105 g of acrylonitrile
210 g of methacrylic acid
1.8 g of a 25% strength by weight aqueous solution of sodium vinylsulfonate
17.2 g of a 40% strength by weight aqueous solution of sodium n-tetradecylsulfonate and
75 g of a 20% strength by weight aqueous solution of ethoxylated para-n-octylphenol (EO degree: 25)

DAV1: A mixture of 592.6 g of water, 4.2 g of a 25% strength by weight aqueous solution of sodium vinylsulfonate and 84.7 g of an aqueous monomer emulsion MV1 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion MV1 were added continuously to the reaction mixture via separate feeds over the course of 2 hours while maintaining the polymerization temperature, and the mixture was then polymerized for a further 1 hour.

MV1: 538.2 g of water
1185 g of n-butyl acrylate
105 g of acrylonitrile 210 g of methacrylic acid
1.8 g of a 25% strength by weight aqueous solution of sodium vinylsulfonate
3.7 g of a 40% strength by weight aqueous solution of sodium n-tetradecylsulfonate and
75 g of a 20% strength by weight aqueous solution of ethoxylated para-n-octylphenol (EO degree: 25)

DA4: A mixture of 644 g of water, and 21.4 g of a 28% strength by weight aqueous solution of the sodium salt of the sulfated derivative of ethoxylated n-tetradecanol (EO degree: 2.5) was heated to the polymerization temperature of 85° C., with 24.9 g of an initiator solution comprising 9.6 g of sodium peroxydisulfate in 240 g of water being additionally added to the reaction mixture when the temperature had reached 70° C. 5 minutes later, the remainder of the initiator solution and the monomer emulsion M4 were added continuously to the reaction mixture via separate feeds over the course of 2 hours while maintaining the temperature, and the mixture was then polymerized for a further 1 hour.

M4:
808 g of water
486 g of styrene
420 g of n-butyl acrylate
120 g of methyl methacrylate
174 g of methacrylic acid
128.5 g of a 28% strength by weight aqueous solution of the sodium salt of the sulfated derivative of ethoxylated n-tetradecanol (EO degree: 2.5)

DA5: A mixture of 659.4 g of water, and 106.8 g of an aqueous monomer emulsion M5 was heated to the polymerization temperature of 85° C., with 24.9 g of an initiator solution comprising 9.6 g of sodium peroxydisulfate in 240 g of water being additionally added to the reaction mixture when the temperature had reached 70° C. After polymerization for 15 minutes at 85° C., the remainder of the initiator solution and the monomer emulsion M5 were added continuously to the reaction mixture via separate feeds over the course of 2 hours while maintaining the polymerization temperature, and the mixture was then polymerized for a further 1 hour.

M5:
808 g of water
486 g of styrene
420 g of n-butyl acrylate
120 g of methyl methacrylate
174 g of methacrylic acid
128.5 g of a 28% strength by weight aqueous solution of the sodium salt of the sulfated derivative of ethoxylated n-tetradecanol (EO degree: 2.5)

DA6: A mixture of 330 g of water, and 53.1 g of an aqueous monomer emulsion M6 was heated to the polymerization temperature of 85° C., with 12.4 g of an initiator solution comprising 4.8 g of sodium peroxydisulfate in 120 g of water being additionally added to the reaction mixture when the temperature had reached 70° C. After polymerization for 15 minutes at 85° C., the remainder of the initiator solution and the monomer emulsion M6 were added continuously to the reaction mixture via separate feeds over the course of 2 hours while maintaining the polymerization temperature, and the mixture was then polymerized for a further 1 hour.

M6:
397.4 g of water
243 g of styrene
210 g of n-butyl acrylate
60 g of methyl methacrylate
87 g of methacrylic acid
60 g of a 20% strength by weight aqueous solution of ethoxylated para-n-octylphenol (EO degree: 25) and
6.4 g of a 28% strength by weight aqueous solution of the sodium salt of the sulfonated derivative of ethoxylated n-tetradecanol (EO degree: 2.5)

DA7: A mixture of 330 g of water, and 53.1 g of an aqueous monomer emulsion M7 was heated to the polymerization temperature of 85° C., with 12.4 g of an initiator solution comprising 4.8 g of sodium peroxydisulfate in 120 g of water being additionally added to the reaction mixture when the temperature had reached 70° C. After polymerization for 15 minutes at 85° C., the remainder of the initiator solution and the monomer emulsion M7 were added continuously to the reaction mixture via separate feeds over the course of 2 hours while maintaining the polymerization temperature, and the mixture was then polymerized for a further 1 hour.

M7:
398.9 g of water
243 g of styrene
210 g of n-butyl acrylate
60 g of methyl methacrylate
87 g of methacrylic acid
60 g of a 20% strength by weight aqueous solution of ethoxylated para-n-octylphenol (EO degree: 25) and
4.2 g of a 28% strength by weight aqueous solution of the sodium salt of the sulfated derivative of ethoxylated n-tetradecanol (EO degree: 2.5)

DAV2: A mixture of 330 g of water and 53.1 g of an aqueous monomer emulsion MV2 was heated to the polymerization temperature of 85° C., with 12.4 g of an initiator solution comprising 4.8 g of sodium peroxydisulfate in 120 g of water being additionally added to the reaction mixture when the temperature had reached 70° C. After polymerization for 15 minutes at 85° C., the remainder of the initiator solution and the monomer emulsion MV2 were added continuously to the reaction mixture via separate feeds over the course of 2 hours while maintaining the polymerization temperature, and the mixture was then polymerized for a further 1 hour.

MV2:
400.5 g of water
243 g of styrene
210 g of n-butyl acrylate
60 g of methyl methacrylate
87 g of methacrylic acid
60 g of a 20% strength by weight aqueous solution of ethoxylated para-n-octylphenol (EO degree: 25) and
2.1 g of a 28% strength by weight aqueous solution of the sodium salt of the sulfated derivative of ethoxylated n-tetradecanol (EO degree: 2.5)

DA8: A mixture of 591.5 g of water, 4.2 g of a 25% strength by weight aqueous solution of sodium vinylsulfonate and 84.6 g of an aqueous monomer emulsion M8 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion M8 were added continuously to the reaction mixture via separate feeds over the course of 2 hours while maintaining the polymerization temperature, and the mixture was then polymerized for a further 1 hour.

M8:
583.9 g of water
1185 g of n-butyl acrylate
105 g of acrylonitrile
210 g of methacrylic acid
1.8 g of a 25% strength by weight aqueous solution of sodium vinylsulfonate and
30 g of a 40% strength by weight aqueous solution of sodium n-tetradecylsulfonate.

DA9: As DA1, but the aqueous monomer emulsion M1 was replaced by a monomer emulsion M9.

M9:
591.5 g of water
1290 g of n-butyl acrylate
210 g of methacrylic acid
1.8 g of a 25% strength by weight aqueous solution of sodium vinylsulfonate and
14.6 g of a 40% strength by weight aqueous solution of sodium n-tetradecylsulfonate.

DA10: As DA1, but the aqueous monomer emulsion M1 was

-continued

```
            replaced by a monomer emulsion M10.
       M10:  591.4 g of water
              945  g of n-butyl acrylate
              360  g of acrylonitrile
              150  g of methacrylic acid
               45  g of methacrylamide
              1.8  g of a 25% strength by weight aqueous
                   solution of sodium vinylsulfonate and
             14.6  g of a 40% strength by weight aqueous
                   solution of sodium n-tetradecyl-
                   sulfonate
DA11:  As DA1, but the aqueous monomer emulsion M1 was
       replaced by a monomer emulsion M11.
       M11:  591.2 g of water
              840  g of n-butyl acrylate
              105  g of acrylonitrile
              375  g of methacrylic acid
              180  g of methyl acrylate
              1.8  g of a 25% strength by weight aqueous
                   solution of sodium vinylsulfonate
                   and
             14.6  g of a 40% strength by weight aqueous
                   solution of sodium n-tetradecyl-
                   sulfonate.
DA12:  As DA1, but the aqueous monomer emulsion M1 was
       replaced by a monomer emulsion M12 and the 12 g of
       sodium peroxydisulfate were replaced by 21 g of
       sodium peroxydisulfate.
       M12:  591.5 g of water
              840  g of n-butyl acrylate
              105  g of acrylonitrile
             175.5 g of acrylic acid
             379.5 g of methyl methacrylate
              1.8  g of a 25% strength by weight aqueous
                   solution of sodium vinylsulfonate
                6  g of tert-dodecyl mercaptan and
             14.6  g of a 40% strength by weight aqueous
                   solution of sodium n-tetradecyl-
                   sulfonate.
DA13:  As DA1, but the aqueous monomer emulsion M1 was
       replaced by a monomer emulsion M13.
       M13:  591.4 g of water
              810  g of n-butyl acrylate
              105  g of acrylonitrile
              210  g of methacrylic acid
              375  g of vinyl acetate
              1.8  g of a 25% strength by weight aqueous
                   solution of sodium vinylsulfonate and
             14.6  g of a 40% strength by weight aqueous
                   solution of sodium n-tetradecyl-
                   sulfonate.
DA14:  As DA1, but the aqueous monomer emulsion M1 was
       replaced by a monomer emulsion M14.
       M14:  591.2 g of water
             1320  g of n-butyl acrylate
              105  g of acrylonitrile
               75  g of methacrylic acid
              1.8  g of a 25% strength by weight aqueous
                   solution of sodium vinylsulfonate and
             14.6  g of a 40% strength by weight aqueous
                   solution of sodium n-tetradecyl-
                   sulfonate.
DA15:  A mixture of 136 kg of water, 1.33 kg of a 45%
       strength by weight aqueous solution of a mixture of
       sodium salts of disulfonated mono- and didodecyl-
       diphenyl ethers, 5.6 kg of an initiator solution
       comprising 4 kg of sodium peroxydisulfate in 56 kg
       of water, and 59 kg of a monomer emulsion M15 is
       heated to the polymerization temperature of 90° C.
       After polymerization for 20 minutes at 90° C., the
       remainder of the initiator solution and the monomer
       emulsion M15 were added continuously to the reaction
       mixture via separate feeds over the course of
       5 hours while maintaining the polymerization temper-
       ature, and the mixture was then polymerized for a
       further two hours.
       M15:  145.2 kg of water
             40.0  kg of a 3% strength by weight aqueous
                   solution of sodium pyrophosphate
               12  kg of methacrylamide
              200  kg of butadiene
            148.0  kg of acrylic acid
              7.2  kg of tert-dodecyl mercaptan
              1.8  kg of a 15% strength by weight aqueous
                   solution of sodium n-dodecylsulfate
                   and
              1.8  kg of a 45% strength by weight aqueous
                   solution of a mixture of sodium salts
                   of disulfonated mono- and didodecyl-
                   diphenyl ethers.
DAV3:  As DA1, but the aqueous monomer emulsion M1 was
       replaced by a monomer emulsion MV3.
       MV3:  421.5 g of water
             1185  g of n-butyl acrylate
              210  g of methacrylic acid
               75  g of acrylonitrile
              200  g of a 15% strength by weight aqueous
                   solution of N-methylolmethacrylamide.
```

Small amounts of coagulate were removed by filtration (pore diameter: $1.2 \cdot 10^{-4}$ m) from the aqueous polymer dispersions obtained in this way.

Table 1 gives a summary of the essential features of the starting dispersions DA1 to DA15 and DAV1 and DAV2. The mean particle side d of the respective disperse phase was determined by the dynamic light scattering method using an Autosizer IIC from Malvern Instruments Ltd., Spring Lane South, Worcestershire, WR14 1AQ, England. The abbreviation SC denotes solids content and TG denotes glass transition temperature. The TG values were in all cases calculated by the Fox method, in which calculation a Tg value of 0° C. was employed for the homopolymers of sodium vinylsulfonate and N-methylolmethacrylamide.

TABLE 1

| Starting dispersion | SC (% by wt.) | LT | $\bar{d}$(nm) | Tg (°C.) |
|---|---|---|---|---|
| DA1  | 50   | 77 | 178.9 | −18 |
| DA2  | 50   | 55 | 291.5 | −18 |
| DA3  | 50.5 | 47 | 336.0 | −18 |
| DAV1 | 49.9 | 6  | 473.6 | −18 |
| DA4  | 40.9 | 96 | 66.9  | 42  |
| DA5  | 40.5 | 86 | 108.3 | 42  |
| DA6  | 40.8 | 41 | 204.5 | 42  |
| DA7  | 40.3 | 32 | 278.0 | 42  |
| DAV2 | 39.9 | 9  | 439.7 | 42  |
| DA8  | 50.1 | 66 | —     | 5   |
| DA9  | 49.7 | 77 | —     | −26 |
| DA10 | 49.6 | 73 | —     | 0   |
| DA11 | 50.1 | 68 | 203.3 | 7   |
| DA12 | 50.6 | 71 | —     | 6   |
| DA13 | 50.3 | 74 | 185.9 | 0   |
| DA14 | 49.9 | 77 | 172.3 | −31 |
| DA15 | 49.9 | 60 | —     | −13 |
| DAV3 | 50.3 | 79 | 169.1 | −18 |

EXAMPLE 2

Zinc Oxide-containing Polymer Dispersions DE1 to DE5 According to the Invention and Comparative Dispersions DEV1 to DEV6

An aqueous ZnO paste was prepared by stirring 375 g of water into 625 g of ZnO (red seal quality from Metall und Farbwerke GmbH Grillo Werke AG, D-3380 Goslar, BET surface area from 3 to 5 m$^2$), added in certain amounts to certain starting dispersions and stirred into these starting dispersions at certain temperatures for various times.

The coagulate formed was then removed by filtration (pore diameter: $1.2 \cdot 10^{-4}$ m), dried at 60° C. and determined gravimetrically. The dispersion obtained in this way was then left alone for 1 week, inspected visually for sedimentation and used to produce a film.

| | | |
|---|---|---|
| DE1: | Starting dispersion: | 143.1 g of DA1 |
| | ZnO paste: | 6.9 g |
| | Temperature: | 25° C. |
| | Stirring-in time: | 2 h |
| | Coagulate: | 0.0107 g |
| | After standing for one week, the dispersion DE1 formed no sediment and produced clear films. | |
| DE2: | Starting dispersion: | 136.6 g of DA2 |
| | ZnO paste: | 6.5 g |
| | Temperature: | 25° C. |
| | Stirring-in time: | 2 h |
| | Coagulate: | 0.054 g |
| | After standing for one week, the dispersion DE2 formed no sediment and produced clear films. | |
| DE3: | Starting dispersion: | 131.7 g of DA3 |
| | ZnO paste: | 6.3 g |
| | Temperature: | 25° C. |
| | Stirring-in time: | 2 h |
| | Coagulate: | 0.0277 g |
| | After standing for one week, the dispersion DE3 formed no sediment and produced clear films. | |
| DEV1: | Starting dispersion: | 142.3 g of DAV1 |
| | ZnO paste: | 6.7 g |
| | Temperature: | 25° C. |
| | Stirring-in time: | 2 h |
| | Coagulate: | 0.0056 g |
| | After standing for one week, the dispersion DEV1 formed a sediment. | |
| DE4: | Starting dispersion: | 137.5 g of DA5 |
| | ZnO paste: | 5.5 g |
| | Temperature: | 70° C. |
| | Stirring-in time: | 2 h |
| | Coagulate: | 0.0161 g |
| | After standing for one week, the dispersion DE4 formed no sediment and produced clear films. | |
| DE5: | Starting dispersion: | 130.8 g of DA6 |
| | ZnO paste: | 5.2 g |
| | Temperature: | 70° C. |
| | Stirring-in time: | 2 h |
| | Coagulate: | 0.0010 g |
| | After standing for one week, the dispersion DE5 formed no sediment and produced clear films. | |
| DEV2: | Starting dispersion: | 143.4 g of DAV2 |
| | ZnO paste: | 5.6 g |
| | Temperature: | 25° C. |
| | Stirring-in time: | 4 h |
| | Coagulate: | 0.0094 g |
| | After standing for one week, the dispersion DEV2 exhibited increased sedimentation and formed cloudy films. | |
| DEV3: | Starting dispersion: | 139 g of DAV2 |
| | ZnO paste: | 5.5 g |
| | Temperature: | 70° C. |
| | Stirring-in time: | 2 h |
| | Coagulate: | 0.00631 g |
| | After standing for one week, the dispersion DEV3 exhibited sedimentation and formed cloudy films. | |
| DEV4: | Starting dispersion: | 140.6 g of DA5 |
| | ZnO paste: | 5.6 g |
| | Temperature: | 25° C. |
| | Stirring-in time: | 4 h |
| | Coagulate: | 0.0387 g |
| | After standing for one week, the dispersion DEV4 exhibited increased sedimentation and formed cloudy films. | |
| DEV5: | Starting dispersion: | 132.7 g of DA6 |
| | ZnO paste: | 5.3 g |
| | Temperature: | 25° C. |
| | Stirring-in time: | 4 h |
| | Coagulate: | 0.0065 g |
| | After standing for one week, the dispersion DEV5 exhibited sedimentation and formed cloudy films. | |
| DEV6: | Starting dispersion: | 124.0 g of DA7 |
| | ZnO paste: | 5.0 g |
| | Temperature: | 25° C. |
| | Stirring-in time: | 4 h |
| | Coagulate: | 0.0078 g |
| | After standing for one week, the dispersion DEV6 exhibited sedimentation and formed cloudy films. | |

EXAMPLE 3

Flow Behavior and Frost Stability a) Measurement Methods

The viscosity was determined in accordance with DIN 53019 using a rotation viscosimeter (Contraves-Rheometer 7978 STV FCN, Contraves AG, Zurich). Cup 25 or 45 was used; the measurement was if possible carried out using speed I, II or III of the rheometer. To determine the frost stability, 400 g of dispersion were introduced into 500 ml capacity polyethylene bottles, and placed in a freezer at $-50°$ C. for 8 hours. The dispersion was then thawed for 16 hours and assessed. A maximum of three cycles were carried out.

b) Test

Flow Behavior 5.3 g of the ZnO paste from Example 2 were stirred into 100 g of the starting dispersion DA1 at room temperature for 2 hours. A low viscosity dispersion having a solids content of 50% by weight was obtained. This dispersion was subsequently diluted with water with stirring to a solids content of about 40% by weight, and the viscosity was measured:

| | | | Viscosity/mPas | | |
|---|---|---|---|---|---|
| SC/% by wt. | pH | Cup | Speed I | II | III |
| 50 | 5.8 | 45 | — | 21 | 17 |
| 40 | 6.0 | 45 | — | — | 8 |
| 50[1] | 3.0[1] | 45[1] | — | 27[1] | 22[1] |

[1]Comparative values for the starting dispersion DA1 (without metal)

Frost Stability

The batches with different solids contents were tested for frost stability. In the dispersion having a solids content of 50% by weight, the viscosity increases, but the dispersion can be stirred up again. At a solids content of 40% by weight, the dispersion remains of low viscosity.

By contrast, the dispersion DA1 (without metal) coagulates after the 1st cycle.

EXAMPLE 4

Testing of the Internal Strength at Elevated Temperature of Nonwoven Materials Containing Polymer Dispersions According to the Invention or Comparative Dispersions as Binders a) Production of Test Strips The polymer dispersion was applied by impregnation to a mechanically pre-strengthened 200 g/m² polyester spunbond which is suitable for bitumen-treated roof sheeting, the excess binder was then removed between two counterrotating rolls, and the binder-containing nonwoven material was exposed to a temperature of from 170° to 200° C. for 10 minutes. The counterpressure of the rolls was set so that the resultant material, from which rectangular test strips 320 mm in length and 50 mm in width were subsequently cut, contained 40 g of dry binder per m².

b) Test Procedure

The test strips were clamped on their narrow sides (50 mm) between two opposing clamps, of which one was fixed and the other movable. The movable clamp was attached to a position sensor and, via a deflection roller, to an 8 kg weight.

The test strips were exposed to a temperature of 176° C. for 3 minutes and, as a measure of the internal strength, the elongation (final length—initial length) and the contraction (width of the test strips at the narrowest point) in each case in mm, were determined.

c) Polymer Dispersions Used and Measurement Results 5.3 g of the ZnO paste from Example 2 were stirred into 100 g of Da1 at 25° C. for 2 hours. The dispersion obtained was then diluted to an overall solids content of 10% by weight.
Elongation: 30.7 mm
Contraction: 29.3 mm A slurry of 2.2 g of calcium oxide in 5 g of water was stirred into 100 g of DA1 at 25° C. for 2 hours. The resultant dispersion was then diluted to an overall solids content of 10% by weight.
Elongation: 41.9 mm
Contraction: 23.0 mm A slurry of 1.6 g of magnesium oxide in 5 g of water was stirred into 100 g of DA1 at 25° C. for 2 hours. The resultant dispersion was then diluted to an overall solids content of 10% by weight.
Elongation: 38.1 mm
Contraction: 27.0 mm A slurry of 1.4 g of MgO in 5 g of water was stirred into 100 g of DA8 at 25° C. for 2 hours. The resultant dispersion was then diluted to an overall solids content of 10% by weight.
Elongation 38.9 mm
Contraction: 21 mm A slurry of 1.1 g of CaO in 5 g of water was stirred into 100 g of DA8 at 25° C. for 2 hours. The resultant dispersion was then diluted to an overall solids content of 10% by weight.
Elongation: 35.7 mm
Contraction: 22 mm 4.5 g of the ZnO paste from Example 2 were stirred into 100 g of DA4 at 75° C. for 2 hours. The dispersion obtained was then diluted to an overall solids content of 10% by weight.
Elongation: 35.8 mm
Contraction: 23 mm 4.4 g of $ZnCO_3 \cdot Zn(OH)_2$ were stirred into 100 g of Da1 at 25° C. for 2 hours. The dispersion obtained was then diluted to an overall solids content of 10% by weight.
Elongation: 33.2 mm
Contraction: 26.5 mm 5.4 g of the ZnO paste from Example 2 were stirred into 100 g of DA12 at 75° C. for 2 hours. The dispersion obtained was then diluted to an overall solids content of 10% by weight.
Elongation: 46 mm
Contraction: 20.5 mm 5.3 g of the ZnO paste from Example 2 were stirred into 100 g of DA9 at 25° C. for 2 hours. The dispersion obtained was then diluted to an overall solids content of 10% by weight.
Elongation: 40.5 mm
Contraction: 22 mm 1.6 g of the ZnO paste from Example 2 was stirred into 100 g of DA13 at 30° C. for 2 hours. The dispersion obtained was then diluted to an overall solids content of 10% by weight.
Elongation: 35.7 mm
Contraction: 25.5 mm 5.7 g of the ZnO paste from Example 2 were stirred into 100 g of DA11 at 75° C. for 2 hours. The dispersion obtained was then diluted to an overall solids content of 10% by weight.
Elongation: 35 mm
Contraction: 28.5 mm 1.9 g of the ZnO paste from Example 2 was stirred into 100 g of DA14 at 25° C. for 2 hours. The dispersion obtained was then diluted to an overall solids content of 10% by weight.
Elongation: 45.9 mm
Contraction: 16.5 mm 3.7 g of the ZnO paste from Example 2 were stirred into 100 g of DA10 at 75° C. for 2 hours. The dispersion obtained was then diluted to an overall solids content of 10% by weight.
Elongation: 38.3 mm
Contraction: 25.5 mm In all cases, the dispersions obtained before dilution exhibit, after standing for one week, no sedimentation and produce clear films.

For comparison, DAV3 was used, likewise after dilution to a solids content of 10% by weight.
Elongation: 53 mm
Contraction: 14.5 mm

EXAMPLE 5

Water Resistance Testing of Nonwoven Materials Containing the Polymer Dispersions According to the Invention

| | |
|---|---|
| DE6: | A mixture of 591.5 g of water, 2.6 g of a 40% strength by weight aqueous solution of sodium tetradecylsulfonate, 4.2 g of a 25% strength by weight aqueous solution of sodium vinylsulfonate and 84.3 g of an aqueous monomer emulsion M16 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion M16 were added continuously to the reaction mixture via separate feeds over the course of 2 hours while maintaining the polymerization temperature, and the mixture was then polymerized for a further 1 hour. Solids content of the dispersion 49.4% by weight, LT 77%, d = 170.4 nm. |
| M16: | 591.5 g of water<br>1170 g of n-butyl acrylate<br>210 g of methacrylic acid<br>105 g of acrylonitrile<br>15 g of acrylamido glycolic acid<br>1.8 g of a 25% strength by weight aqueous solution of sodium vinylsulfonate and<br>14.6 g of a 40% strength by weight aqueous solution of sodium n-tetradecylsulfonate. |
| | 4.7 g of the ZnO paste mentioned in Example 2 were stirred into 100 g of this dispersion at 25° C., corresponding to 44 mol %. |
| DE7: | The procedure is as in DE6, but the monomer emulsion M17 having the following composition is used: |
| M17: | 591.5 g of water<br>1140 g of n-butyl acrylate<br>210 g of methacrylic acid<br>105 g of acrylonitrile<br>45 g of acrylamidoglycolic acid<br>1.8 g of a 25% strength by weight aqueous solution of sodium vinylsulfonate and<br>14.6 g of a 40% strength by weight aqueous solution of sodium n-tetradecylsulfonate. |
| | Solids content of the dispersion 49.5% by weight, |

-continued

LT 49%, d̄ = 310.8 nm.
4.7 g of the ZnO paste were stirred in as described for DE6.

DE8: The procedure is as in DE6, but the monomer emulsion M18 having the following composition is used:

M18:
- 506.3 g of water
- 1185 g of n-butyl acrylate
- 210 g of methacrylic acid
- 90 g of acrylonitrile
- 100 g of a 15% strength by weight aqueous solution of N-methylolmethacrylamide
- 1.8 g of a 25% strength by weight aqueous solution of sodium vinylsulfonate and
- 14.6 g of a 40% strength by weight aqueous solution of sodium n-tetradecyl-sulfonate.

Solids content of the dispersion 49.7% by weight, LT 74%, d̄ = 184.1 nm.
4.7 g of the ZnO paste were stirred in as described for DE6.

DE9: The procedure is as in DE6, but the monomer emulsion M19 having the following composition is used:

M19:
- 421.3 g of water
- 1185 g of n-butyl acrylate
- 210 g of methacrylic acid
- 75 g of acrylonitrile
- 200 g of a 15% strength by weight aqueous solution of N-methylolmethacrylamide
- 1.8 g of a 25% strength by weight aqueous solution of sodium vinylsulfonate and
- 14.6 g of a 40% strength by weight aqueous solution of sodium n-tetradecyl-sulfonate.

Solids content of the dispersion 49.5% by weight, LT 76%, d̄ = 166.5 nm.
4.7 g of the ZnO paste were stirred in as described for DE6.

DE10: The procedure is as in DE6, but the monomer emulsion M20 having the following composition is used:

M20:
- 294 g of water
- 1132.5 g of n-butyl acrylate
- 210 g of methacrylic acid
- 105 g of acrylonitrile
- 350 g of a 15% strength by weight aqueous solution of N-methylolmethacrylamide
- 1.8 g of a 25% strength by weight aqueous solution of sodium vinylsulfonate and
- 14.6 g of a 40% strength by weight aqueous solution of sodium n-tetradecyl-sulfonate.

Solids content of the dispersion 49.5% by weight, LT 78%
5.2 g of the ZnO paste were incorporated as described for DE6, corresponding to 49 mol %.

DE11: A mixture of 591.3 g of water, 2.6 g of a 40% strength by weight aqueous solution of sodium tetradecylsulfonate, 4.2 g of a 25% strength by weight aqueous solution of sodium vinylsulfonate and 84.3 g of the aqueous monomer emulsion M1 was heated to the polymerization temperature of 85° C., with 43.6 g of an initiator solution comprising 12 g of sodium peroxydisulfate in 279 g of water being additionally added to the reaction mixture when the temperature had reached 70° C. After polymerization for 15 minutes at 85° C., the remainder of the initiator solution and the monomer emulsion M1 were added continuously to the reaction mixture via separate feeds over the course of 2 hours while maintaining the polymerization temperature, and the mixture was then polymerized for a further 1 hour. Solids content of the dispersion 50.0% by weight, LT 77%, d̄ = 178.9 nm.
5.3 g of the ZnO paste were stirred into 100 g of this dispersion as described for DE6.
5 parts by weight of an aqueous solution of a resol having a solids content of 20% by weight were stirred into 95 parts by weight of this zinc-containing dispersion. The resol used comprised bisphenol A and formaldehyde in a molar ratio of 1:3.7.

-continued

The alkali metal content was 5%.

Test Method

For the purposes of the present invention, the water resistance or wet strength of a nonwoven material is taken to mean the tear strength of the wet material after defined storage in water.

In order to make the effect of the binder clearly visible, a binder-free nonwoven comprising 70% of cellulose and 30% of viscose staple fiber with a weight of 35 g/m$^2$, produced by the wet nonwoven process (E. A. Schöffmann, Wochenblatt f. Papierfabrikation 97, No. 17 (1969), pp. 703–710), was chosen for the tests. This material has no wet tear strength without binder.

Nonwoven pieces measuring about 30 cm by 22 cm were placed on a circulating polyester base woven material and, together with the woven material, passed through a shallow impregnation trough containing the binder liquor. The excess liquor was subsequently removed from the material via a suction slot. The liquor concentration and the vacuum applied to the suction slot were selected so that a binder application rate of about 50% by weight, based on the fiber weight, was achieved after drying. The drying temperature was 170° C.

Strips measuring 140 mm by 50 mm were stamped from the dried nonwoven materials. The strips were placed in water at room temperature containing 1% of wetting agent. After one hour, the tear strength of the wet strips was measured.

Table 2 below the wet tear strengths obtained for the cellulose/viscose staple fiber nonwovens described containing various binders.

TABLE 2

| Binder | Wet tear strength N/5 cm width |
|---|---|
| DE 6 | 15 |
| DE 7 | 15 |
| DE 8 | 26 |
| DE 9 | 33 |
| DE 10 | 23 |
| DE 11 | 42 |

We claim:

1. A process for the preparation of an aqueous polymer dispersion, which comprises:
incorporating one or more divalent metals selected from the group consisting of magnesium, calcium and zinc, in the form of an oxide, hydroxide, carbonate or bicarbonate, or in the form of a mixture of these basic salts into an aqueous starting dispersion containing:
from 25 to 60% by weight, based on the aqueous starting dispersion, of a polymer A as the disperse phase,
an effective amount of an emulsifier, and
water as the remainder, at a temperature below the boiling point of pure water and above the glass transition point of the polymer A;
wherein:
said polar A consists essentially of:
from 3 to 55% by weight of monomers a, and
from 45 to 97% by weight of monomers b in polymerized form and having, in disperse form, a mean particle size of from 20 to 400 nm;

said monomers a being one or more α,β-monoethylenically unsaturated mono- or di-carboxylic acids containing from 3 to 5 carbon atoms, an anhydride of these acids or a mixture thereof;

said monomers b being one or more other copolymerizable monomers;

said one or more divalent metals being incorporated into said aqueous starting dispersion in an amount of from 5 to 60 mol-%. based on the number of moles of acid groups of the polymer A copolymerized in the form of monomers a, wherein an anhydride group is counted as two acid groups.

2. The process for the preparation of an aqueous polymer dispersion as claimed in claim 1, wherein said divalent metal is zinc.

3. The process for the preparation of an aqueous polymer dispersion as claimed in claim 1, wherein said divalent metals are incorporated into the aqueous starting dispersion at a pH of less than 3.

4. The process for the preparation of an aqueous polymer dispersion as claimed in claim 1, wherein the divalent metals are incorporated into the aqueous starting dispersion as fine grains having a BET surface area of from 2 to 5 $m^2/g$.

5. The process for the preparation of an aqueous polymer dispersion as claimed in claim 1, which further comprises moistening the divalent metal salts prior to incorporating the same into the aqueous polymer dispersion.

6. The process for the preparation of an aqueous polymer dispersion as claimed in claim 5, wherein said divalent metal salts are moistened by forming a paste having a solids content of from 10 to 80% by weight.

7. The process for the preparation of an aqueous polymer dispersion as claimed in claim 1, wherein said divalent metal salts are incorporated into the aqueous dispersion at 20° C. or more above the glass transition point of the polymer A.

* * * * *